United States Patent [19]

Yamamoto et al.

[11] Patent Number: 5,064,015

[45] Date of Patent: Nov. 12, 1991

[54] SYSTEM AND METHOD FOR AUTOMATICALLY CONTROLLING VEHICLE SPEED TO A DESIRED CRUISE SPEED

[75] Inventors: Isao Yamamoto; Hiroshi Inoue; Kazuyuki Mori; Koichi Suzuki; Kinichiro Nakano; Hiroyuki Nomura; Kiyoshi Yoshida; Yoshiyuki Etoh, all of Kanagawa, Japan

[73] Assignee: Nissan Motor Company, Limited, Yokohama, Japan

[21] Appl. No.: 676,479

[22] Filed: Mar. 27, 1991

Related U.S. Application Data

[63] Continuation of Ser. No. 262,857, Oct. 26, 1988, abandoned.

[30] Foreign Application Priority Data

Oct. 27, 1987 [JP] Japan .......................... 62-163193[U]

[51] Int. Cl.⁵ ............................................. B60K 31/06
[52] U.S. Cl. ...................................... 180/176; 180/179
[58] Field of Search ................ 180/175, 176, 177, 178, 180/179

[56] References Cited

U.S. PATENT DOCUMENTS

| | | | |
|---|---|---|---|
| 3,068,953 | 12/1962 | Petersen | 180/178 |
| 4,133,407 | 1/1979 | Schantz | 180/177 |
| 4,374,422 | 2/1987 | O'Keefe et al. | 180/179 |
| 4,697,478 | 10/1987 | Mastumoto et al. | 180/177 |
| 4,928,779 | 5/1990 | Yamada | 180/178 |
| 4,972,919 | 11/1990 | Ogawa | 180/179 |

FOREIGN PATENT DOCUMENTS 0036026  2/1986  Japan .................... 180/179

Primary Examiner—David M. Mitchell
Attorney, Agent, or Firm—Foley & Lardner

[57] ABSTRACT

A system and method for automatically controlling a vehicle speed to a desired cruise speed includes an inhibit switch connected in parallel to a line between a power supply and a main self hold power supply switch (self-hold type) of an automatic cruise controlling system. When the vehicle speed is below a predetermined value, the inhibit switch is open so that the automatic cruise speed controlling system cannot receive power via the main, switch. Thus, wasteful comsumption of power is reduced.

5 Claims, 1 Drawing Sheet

SYSTEM AND METHOD FOR AUTOMATICALLY CONTROLLING VEHICLE SPEED TO A DESIRED CRUISE SPEED

This application is a continuation of application Ser. No. 07/262,857, filed Oct. 26, 1988, now abandoned.

BACKGROUND OF THE INVENTION (1) Field of the Invention

The present invention relates to a system and method for controlling a vehicle speed to a desired cruise speed in which a power supply to the automatic cruise speed controlling system is inhibited when the vehicle speed is below a predetermined value.

(2) Background of the Art

A Japanese Patent Application First Publication (Unexamined) sho 59-58134 published on Apr. 3, 1984 exemplifies one of previously proposed systems for automatically controlling a vehicle speed to a desired cruise speed in which when a vehicle is accelerated, the vehicle speed arrives at a desired speed, and a driver depresses a cruise speed setting button, an opening angle of an engine throttle valve or carburator is adjusted so that the vehicle speed coincides with the set cruise speed without operation of an accelerator pedal. Therefore, it is convenient for the driver to run the vehicle without operation of the accelerator pedal in a case where the vehicle runs on a freeway.

The operations of such automatic cruise controlling systems are inhibited when a clutch pedal or brake pedal is depressed and when the accelerator pedal is again depressed so that the vehicle speed exceeds the set cruise speed. In this last instance, if depression of the accelerator pedal is halted, the vehicle speed is decreased due to an engine braking and the vehicle speed returns to the set cruise speed. At this time, the vehicle speed can run at the set cruise speed.

However, in such previously proposed automatic cruise speed controlling systems, power supply switches for the systems can always be turned on when ignition switches of the vehicles are in the ON states. Therefore, if the drivers erroneously turn on the power switches when the vehicles stop or run at a low speed at which no automatic cruise control is needed, power is wastefully supplied to the systems.

SUMMARY OF THE INVENTION

It is an object of the present invention to provide a system and method for automatically controlling a vehicle speed to a desired cruise speed in which power to the system is appropriately supplied.

The above-described object can be achieved by providing a system for automatically controlling a vehicle speed to a desired cruise speed, comprising: a) first means for detecting a vehicle speed, b) second means through which a current vehicle speed is set as the cruise speed at which the vehicle is desired to cruise., c) third means responsive to the second means for adjusting an operating variable of a vehicular engine driving force adjusting mechanism according to a difference between the vehicle speed detected by the first means and the set cruise speed so that the vehicle speed coincides with the set cruise speed, and d) fourth means for inhibiting a power supply to the third means even if a main power supply switch is turned on to supply the power to the third means when the vehicle speed is below a predetermined value.

The above-described object can also be achieved by providing a system for automatically controlling a vehicle speed to a desired vehicle speed, comprising: a) first means for detecting a vehicle speed, b) second means through which a current vehicle speed is set as the cruise speed at which the vehicle is desired to cruise., c) third means for adjusting an operating variable of a vehicular engine driving force adjusting mechanism according to a difference between the vehicle speed and the set cruise speed so that the vehicle speed coincides with the set cruise speed, and d) an inhibit switch, connected between a positive electrode of a vehicular battery via an ignition switch and an on position of a self-hold type main switch of the third means, which turns off when the vehicle speed is below a predetermined value.

The above-described object can also be achieved by providing a method for automatically controlling a vehicle speed to a desired cruise speed, comprising the steps of: a) detecting a vehicle speed., b) reading a signal indicating that the current vehicle speed is the cruise speed at which the vehicle is desired to cruise through a set/cruise switch., c) adjusting an operating variable of a vehicular engine driving force adjusting mechanism according to a difference between the vehicle speed and set cruise speed so that the vehicle speed coincides with the set cruise speed; and d) detecting whether the vehicle speed is below a predetermined value and inhibiting a power supply to execute the steps a) to c) when detecting that the vehicle speed is below the predetermined value.

DETAILED DESCRIPTION OF THE PREFERRED EMBODIMENT

Reference will hereinafter be made to the drawings in order to facilitate understanding of the present invention.

Figure 1:
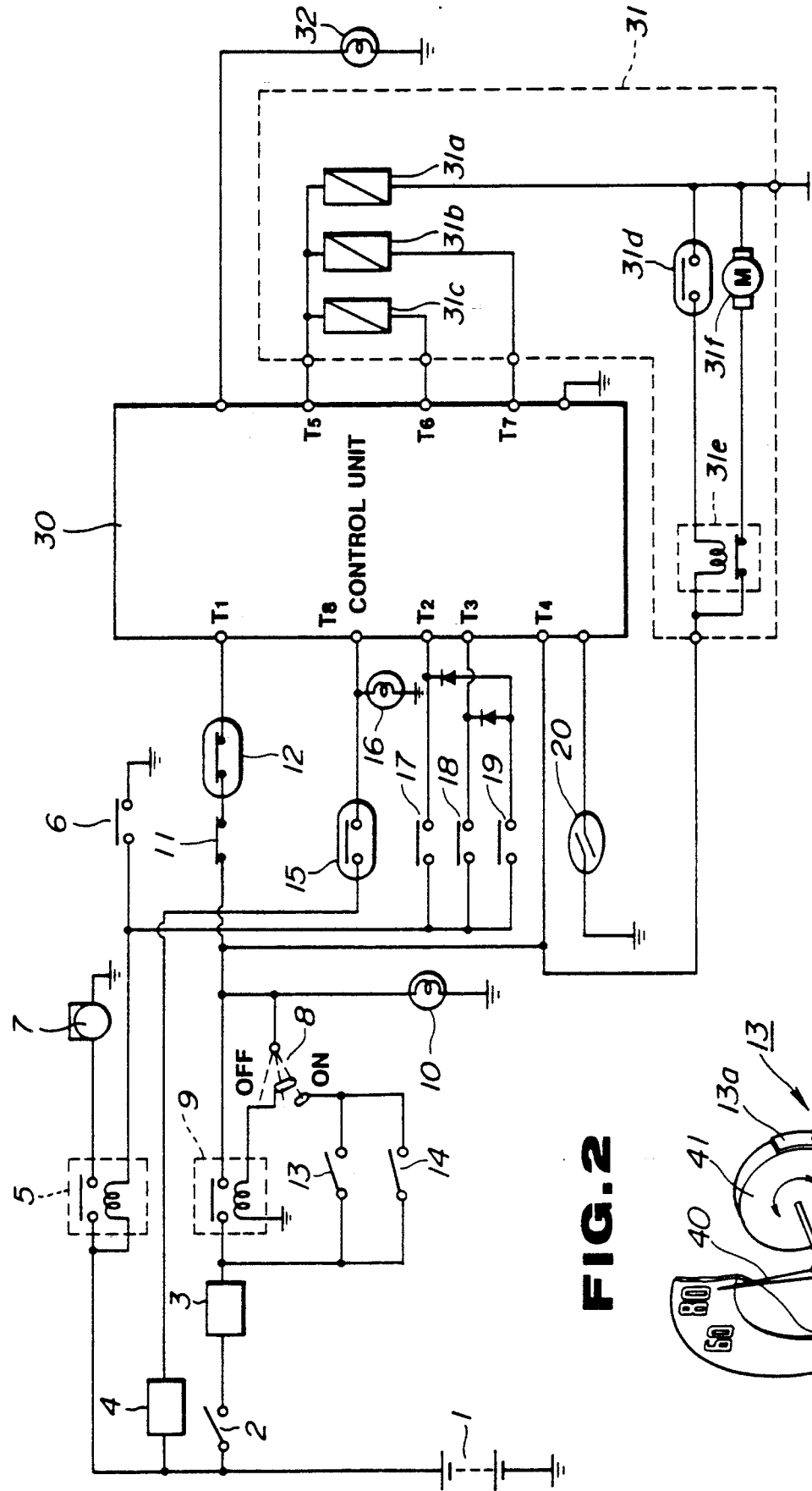
FIG. 1 is a schematic diagram of a system for automatically controlling a vehicle speed to a desired vehicle speed according to the present invention.

FIG. 1 shows an electric circuit wiring diagram of a system for automatically controlling a vehicle speed to a desired cruise speed according to the present invention.

A battery 1 of a vehicle serves as a power supply of the system. A positive electrode of the battery 1 connected to a phone 7 via a phone relay 5 which is energized when a phone switch 6 is turned on. A negative electrode thereof is grounded.

A main switch 8 serves as a power switch for the cruise speed controlling system and has three positions, i.e., an on position, a neutral position and an off position. A main relay 9 is connected in series to an ignition switch 2. The main switch 8 is a self hold type switch self held by means of the main relay 9 and is installed on a part of an instrument panel of the vehicle. Numeral 10 denotes a main lamp which illuminates when the main switch 8 is turned on.

A normally closed clutch switch 11 is connected to the main relay 9 which is turned off (open) when a clutch pedal is depressed. A normally closed brake switch 12 is connected in series with the clutch switch 11 which is turned off (open) when the brake pedal is depressed. The clutch and brake switches are both connected to an input terminal $T_1$ of a control unit 30. It is noted that in a case of an automatic transmission type vehicle, a cut relay and inhibitor switch are provided in the same way as the clutch and brake switches 11 and 12.

In addition, an inhibit switch 13 is connected between a fuse 3 and the on position of the main switch 8 in parallel with the main relay 9. The inhibit switch 13 is turned off when the vehicle speed is below a predetermined value ( for example, 50 Km/h) and is turned on when the vehicle speed is above the predetermined value. It is noted that a normally open switch 14 is connected in parallel to the inhibit switch 13 which is turned on when the brake pedal is depressed.

Figure 2:
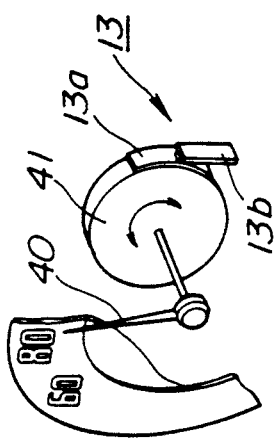
FIG. 2 is a perspective view of an inhibit switch installed in the automatic cruise controlling system shown in FIG. 1.

The inhibit switch 13 includes a movable contact 13a having a constant length and installed on a part of a peripheral edge of an insulating disc 41 rotating with a pointer 40 of a speedometer and a fixed contact 13b fixed on the body of the speedometer, as shown in FIG. 2.

When the vehicle stops or vehicle speed is low, the movable and fixed contacts 13a and 13b are not contacted so that the switch 13 is in the off state. When the vehicle speed is increased, the insulating disc 41 is rotated in a clockwise direction as viewed from FIG. 2. When the vehicle speed exceeds the predetermined value, e.g., 50 Km/h, the movable contact 13a is brought in contact with the fixed contact 13b and the switch 13 is turned on. Therefore, when the vehicle speed is below the predetermined value, the inhibit switch 13 is open so that the main switch 8 cannot be turned on.

However, with conveniences for the driver taken into consideration, the main switch 8 can be turned on if the brake pedal is depressed so that the switch 14 is turned on. Therefore, the system can receive the power supply previously during vehicle parking. Since the main switch 8 is the self hold type, the power supply remains on even when the switch 14 is turned off once the switch 8 is turned on.

Furthermore, in FIG. 1, numeral 4 denotes a fuse, numeral 16 denotes a stop lamp switch which turns on so that a stop lamp is illuminated when the brake pedal is depressed. Numeral 17 denotes a set/cruise switch which turns on when the driver sets the vehicle speed at which the vehicle is to cruise and when the vehicle driver lowers the set cruise speed during the cruise speed control, numeral 18 denotes an acceleration switch which is turned on when the vehicle speed is increased to another set cruise speed, and numeral 19 denotes a cancel switch which is turned on to cancel the cruise speed control. These switches 17 to 19 are installed on a part of a steering wheel. One contact of these switches 17 to 19 are connected to input terminals $T_2$ to $T_3$ Numeral 20 denotes a vehicle speed sensor connected to the control unit 30.

The control unit 30 includes a microcomputer which determines various conditions on the basis of the on- and-off information inputted from each switch and controls an actuator 31 enclosed with a dotted line of FIG. 1.

The actuator 31 is of a positive pressure responsive type which adjusts an opening angle of an engine throttle valve using a compressed air. The actuator 31 includes a release valve 31a for expiring the compressed air derived from a compressed air generating tank (not shown), an air valve 31b for opening the compressed air to the atmosphere, and a supply valve 31c for supplying the compressed air to a diaphragm. The diaphragm operated with these valves is linked to the throttle valve via an accelerator wire so that the opening angle of the throttle valve is adjusted independently of an accelerator pedal. In addition, the tank for reserving the compressed air serves as the drive source of the actuator 31 and is provided with a pressure switch 31d which turns on when the compressed air in the tank exceeds a constant value. When the pressure switch 31d is turned on, a motor relay 31e is energized so that a normally closed contact is open to interrupt the power supply to a motor 31f so that the pressure in the tank is not increased more than the constant value. Thus, the compressed air is always held constant.

It is noted that a cruise lamp 32 is tuned on to indicate that the vehicle speed coincides with the set cruise speed.

Next, an operation of the automatic cruise speed controlling system described above will be described below.

Since the inhibit switch 13 is turned off when the vehicle stops and the vehicle runs at a low speed, the main switch 8 cannot be turned on. Hence, in this case, the automatic cruise control system is not operated and the wasteful consumption of the power does not result even if the driver erroneously operates the main switch 8. It should be noted that in this case if the brake pedal is depressed the switch 14 is turned on and the main switch 8 can be turned on.

When the vehicle speed reaches the predetermined value, the main switch 8 is placed on the on position, the cruise relay 9 is energized, and the switch 8 is held in the on position, the main lamp 10 is illuminated and the power supply voltage is supplied to the input terminals $T_1$ and $T_4$ of the control unit 30 from the battery 1.

When the vehicle speed reaches a speed value at which the driver desires to cruise and the driver depresses the set/cruise switch 17, the control unit 30 stores the set vehicle speed. When the actual vehicle speed outputted from the vehicle speed sensor 20 is compared with the set cruise speed, the control unit 30 outputs a control signal to the actuator 31 according to the difference between the actual vehicle speed and the set cruise speed via the output terminal $T_5$ through $T_7$. The actuator 31 controls the open and/or close status of the release valve, air supply valve, and air valve, 31a, 31c, and 31b on the basis of the contents of the control signal. That is to say, when the vehicle speed exceeds the set cruise speed, the release valve 31a is closed, the air valve 31b is opened, the supply valve 31c is closed so that the throttle valve is placed in the close position When the vehicle speed is below the set cruise speed, the release valve 31a is closed, the air valve 31b is closed, and the supply valve 31c is open so that the throttle valve is placed to the open position.

In this way, the opening angle of the throttle valve is adjusted and the engine revolutional speed is controlled to make the vehicle speed reach the set vehicle speed.

During the cruise control operation described above, if the clutch pedal or brake pedal is depressed, the clutch switch 11 or brake switch 12 is opened so that the power supply to the input terminal $T_1$ of the control unit 30 is interrupted. Therefore, the power supply to the actuator 31 is interrupted, and cruise control is halted. The same sequence occurs when the main switch 8 is turned off.

During the cruise control, when the brake pedal is depressed or the cancel switch 19 is turned on, the power supply voltage is simultaneously supplied to the input terminals $T_8$ or $T_2$ and $T_3$. Therefore, the control unit 30 halts the automatic cruise control.

Furthermore, during the cruise control, if the driver desires to set the cruise speed at a speed higher than the current set cruise speed, the driver continues to depress the acceleration switch 18. When the vehicle speed reaches the subsequent set cruise speed, the driver releases the acceleration switch 18 and the vehicle speed is maintained at the subsequent set cruise speed.

On the other hand, if the vehicle driver sets the cruise speed at a speed lower than the current cruise speed, the set/cruise switch 17 is continued to be depressed so that the vehicle speed decreases due to an engine braking. When the vehicle speed reaches the desired vehicle speed, the switch 17 is released to set the vehicle speed at the desired subsequent vehicle speed.

It is noted that although, in the above-described preferred embodiment, the inhibit switch 13 installed in the speedometer is used to inhibit the turn on of the main switch 8, the vehicle speed may be detected on the basis of a frequency of a vehicle speed indicative signal derived from the vehicle speed sensor and when the detected vehicle speed is below the predetermined value, the supply of the power to the automatic cruise speed controlling system through the main switch 8 may be inhibited.

As described hereinabove, in the system for automatically controlling a vehicle speed to a desired cruise speed according to the present invention, the power main switch cannot be turned on when the vehicle speed is below the predetermined speed. Therefore, the power supply to the automatic cruise speed controlling system can appropriately be carried out without wasteful consumption of power.

It will fully be appreciated by those skilled in the art that the foregoing description is made in terms of the preferred embodiment and various changes and modifications may be made without departing from the scope of the present invention which is to be defined by the appended claims.

What is claimed is:

1. A system for automatically controlling a vehicle speed to a desired cruise speed, the system comprising:
   a) first means for detecting the vehicle speed;
   b) second means for setting a current vehicle speed as the desired cruise speed and for providing a command signal indicative of the desired cruise speed;
   c) third means, responsive to the command signal from the second means, for adjusting an operating variable of a vehicular engine driving force adjusting mechanism according to a difference between the vehicle speed detected by the first means and a set vehicle speed such that the vehicle speed coincides with the desired cruise speed, operating power for the third means being supplied from a vehicular battery via an ignition switch and a relay;
   d) fourth means for detecting whether the vehicle speed is above or below a predetermined vehicle speed, the fourth means having a first switch, the first switch being turned on when the vehicle speed is above the predetermined vehicle speed and being turned off when the vehicle speed is below the predetermined vehicle speed; and
   e) a main switch, connected to a relay contact of the relay, to operatively energize the relay, wherein power from the vehicular battery via the ignition switch and the relay to the third means is carried out when the main switch is placed in its ON position to energize the relay when the first switch is turned on, and once the power supply to the third means is carried out via the main switch in its ON position, power supply to the third means is continued via the relay even when the first switch is, in turn, turned off.

2. A system as set forth in claim 1, wherein the first switch is provided with a movable contact having a constant length installed on a peripheral edge of an insulating disc of a speedometer rotating with a pointer, and a fixed contact on a body of the speedometer, both contacts being separated to turn off the first switch when the vehicle speed is below the predetermined vehicle speed.

3. A system as set forth in claim 1, wherein continuation of the power supply to the third means via the relay is interrupted when the ignition switch is turned off and is interrupted when the main switch is placed in its OFF position.

4. A system as set forth in claim 2, further comprising:
   a second switch, connected in parallel with the first switch, which is turned on when a vehicular brake system is operated;
   and wherein the relay is energized when the main switch is placed in its ON position and the second switch is turned on, power supply to the relay to energize the relay being supplied via the second switch such that the power supply to the third means can be carried out when the vehicle speed is below the predetermined vehicle speed when the vehicular brake system is operated.

5. A system as set forth in claim 4, wherein the predetermined vehicle speed defines a lowest speed limit value above which the third means becomes effective and the predetermined vehicle speed is approximately 50 kilometers per hour.

* * * * *